US008174536B2

(12) United States Patent  (10) Patent No.: US 8,174,536 B2
Itagaki et al.  (45) Date of Patent: May 8, 2012

(54) COLOR DIFFERENCE DISPLAY CONTROL APPARATUS, COLOR DIFFERENCE DISPLAY CONTROL METHOD, AND CONTROL PROGRAM

(75) Inventors: Tomohisa Itagaki, Abiko (JP); Nobuatsu Sasanuma, Abiko (JP); Miyoko Hayashi, Fuchu (JP); Masami Tomita, Matsudo (JP); Toshio Saishoji, Fuchu (JP); Satoshi Takayama, Chofu (JP)

(73) Assignee: Canon Kabushiki Kaisha (JP)

( * ) Notice: Subject to any disclaimer, the term of this patent is extended or adjusted under 35 U.S.C. 154(b) by 669 days.

(21) Appl. No.: 11/669,358

(22) Filed: Jan. 31, 2007

(65) Prior Publication Data

US 2007/0176942 A1    Aug. 2, 2007

(30) Foreign Application Priority Data

Jan. 31, 2006  (JP) .................................. 2006-023624

(51) Int. Cl.
*G09G 5/02*  (2006.01)
*G09G 5/00*  (2006.01)
(52) U.S. Cl. ........................................ 345/589; 345/581
(58) Field of Classification Search .................... 345/589
See application file for complete search history.

(56) References Cited

U.S. PATENT DOCUMENTS

| | | | |
|---|---|---|---|
| 3,504,980 A | 4/1970 | Bentley et al. | |
| 5,990,890 A * | 11/1999 | Etheredge | 715/808 |
| 6,486,923 B1 | 11/2002 | Maeshima et al. | |
| 7,688,326 B2 * | 3/2010 | Cho et al. | 345/581 |
| 2002/0036787 A1 * | 3/2002 | Kondo | 358/1.9 |
| 2003/0048464 A1 | 3/2003 | Yamada et al. | |
| 2003/0184557 A1 | 10/2003 | Wen | |
| 2004/0135782 A1 * | 7/2004 | Marais | 345/440 |
| 2005/0041015 A1 | 2/2005 | Kohda et al. | |
| 2005/0083346 A1 | 4/2005 | Takahashi et al. | |
| 2005/0094170 A1 | 5/2005 | Ichitani | |
| 2006/0082594 A1 * | 4/2006 | Vafiadis et al. | 345/629 |

FOREIGN PATENT DOCUMENTS

| | | |
|---|---|---|
| EP | 1 291 822 A2 | 12/2003 |
| JP | 5-231941 A | 9/1993 |
| JP | 6-035641 A | 2/1994 |

(Continued)

OTHER PUBLICATIONS

The MathWorks, Inc., "Getting Started with MATLAB, Version 7," 2004.*

(Continued)

*Primary Examiner* — Jacinta M Crawford
(74) *Attorney, Agent, or Firm* — Rossi, Kimms & McDowell LLP

(57) ABSTRACT

This invention provides a display control apparatus and control method, which allow the operator to easily identify the correspondence between the patch icons and their color difference values. To accomplish this, the display control method of this invention includes an icon displaying step of displaying a plurality of color difference values computed based on a first data group and second data group associated with spectral reflectance characteristics as a plurality of patch icons. The display control method includes a numeric value displaying step of displaying the color difference values represented by the patch icons in one of a first display format that displays, as numeric values, the color difference values within display regions of the patch icons, and a second display format that displays, as numeric values, the color difference values above display regions of a plurality of patch icons.

19 Claims, 19 Drawing Sheets

FOREIGN PATENT DOCUMENTS

| | | |
|---|---|---|
| JP | 9-219756 A | 8/1997 |
| JP | 2001-075692 A | 3/2001 |
| JP | 2003-099717 A | 4/2003 |
| JP | 2005-91005 A | 4/2005 |
| JP | 2005-100353 A | 4/2005 |

OTHER PUBLICATIONS

Related co-pending U.S. Appl. No. 11/669,298; Nobuatsu Sasanuma et al.; "Display Apparatus, Display Method, and Control Program"; filed Jan. 31, 2007; Spec. pp. 1-38; Figs. 1-12.

Imatest; "Colorcheck: color accuracy and tonal response"; Internet Article, XP002432765; Aug. 28, 2005; retrieved from the Internet URL:http://web.archive.org/web/20070509105942:http://www.imatest.com/docs/ print_tour_colorcheck.html>; retrieved on May 9, 2007.

Relevant Portion of Extended European Search Report issued in corresponding European Patent Application No. 07101168.8-2217, dated Jun. 1, 2007.

Office Action issued in corresponding Japanese Patent Application No. 2006-023624 dated Feb. 22, 2010.

\* cited by examiner

FIG. 4

| LGOROWL | 5 ~401 | | | | | | | | |
|---|---|---|---|---|---|---|---|---|---|
| CREATED | 4 / 14 / 2005 | # Time : 15 : 33 ~402 | | | | | | | |
| INSTRUME | Spectrolino | | | | | | | | |
| MEASURE | EmissionObserverAngle=2-WhiteBase=AbsFilter=No | | | | | | | | |
| KEYWORD | SampleID | | | | | | | | |
| KEYWORD | SAMPLE_NAME | | | | | | | | |
| NUMBER_ | 10 ~403 | | | | | | | 404 | |
| BEGIN_DATA_FORMAT | | | | | | | | | |
| SampleID | RGB_R | RGB_G | RGB_B | XYZ_X | XYZ_Y | XYZ_Z | LAB_L | LAB_A | LAB_B |
| END_DATA_FORMAT | | | | | | | | | |
| NUMBER_ | 40 ~405 | | | | | | | 406 | |
| BEGIN_DATA | | | | | | | | | |
| 1A | 0 | 0 | 0 | 0.45 | 0.39 | 0.49 | 3.55 | 2.98 | -3.07 |
| 2A | 128 | 0 | 0 | 11.12 | 6.23 | 0.99 | 29.99 | 45.12 | 33.52 |
| 3A | 255 | 0 | 0 | 37.98 | 20.9 | 2.35 | 52.84 | 69.81 | 57.64 |
| 4A | 255 | 153 | 0 | 52.89 | 28.15 | 81.58 | 60.03 | 81.6 | -68.18 |
| 5A | 255 | 204 | 255 | 58.53 | 47.79 | 58.9 | 74.69 | 32.43 | -22.39 |

FIG. 9

COLOR DIFFERENCE DISPLAY CONTROL APPARATUS, COLOR DIFFERENCE DISPLAY CONTROL METHOD, AND CONTROL PROGRAM

BACKGROUND OF THE INVENTION

1. Field of the Invention

The present invention relates to a color difference display control apparatus, color difference control method, and control program, which evaluate the reproducibility of colors in an image forming apparatus and the like.

2. Description of the Related Art

Originally, various image output apparatuses such as printers, facsimiles, monitors, and the like, which handle color images preferably have uniform color reproducibility in themselves. In order to attain uniform color reproducibility among various image output apparatuses, color evaluation and correction have been conducted for output results.

Japanese Patent Application Laid-Open No. 2005-91005 discloses a color evaluation apparatus which individually performs color evaluation in specific color regions. Especially, the invention of Japanese Patent Application Laid-Open No. 2005-91005 performs color evaluation for respective individual regions such as a flesh color region, red region, green region, blue region, and the like.

Japanese Patent Application Laid-Open No. 5-231941 discloses a technique that objectively applies color correction for a given device by comparing measured data of a printed material printed by this device and previous measured data. Compared to a color evaluation method by visual confirmation of an operator, the color evaluation method of Japanese Patent Application Laid-Open No. 5-231941 is effective to reduce unnecessary color correction due to individual differences.

The above mentioned prior arts adopt, as a display method of color difference values of printed materials, a method of displaying color differences in patch icons corresponding to patches regardless of the number of patches. The prior arts display the color difference values corresponding to patches in the form of a graph, and display color differences $\Delta a^*$, $\Delta b^*$, and the like on a coordinate system, thus representing color biases in detail.

However, these prior arts suffer the following problems. In the output format that displays color difference values in display regions of patch icons, the display region per patch icon narrows with an increasing number of patches. If all the color values are displayed in the narrow display regions by decreasing a font size, it becomes difficult to identify the color values. By contrast, if the font size is increased, the color difference values cannot be completely displayed since the display regions remain narrow.

SUMMARY OF THE INVENTION

The present invention enables to provide a display control apparatus and control method, which allows the user to select an output format of color difference values in accordance with the size of each patch icon, and to easily identify the correspondence between the patch icons and color difference values.

According to the present invention, the foregoing problem is solved by providing a color difference display control method comprising: a step of inputting data associated with spectral reflectances of respective patches on a first measurement chart and a second measurement chart which record a plurality of color patches; a step of computing color difference values between the patches corresponding to identical positions on the first measurement chart and the second measurement chart based on the data input in the inputting step; a icon displaying step of displaying the plurality of computed color difference values as a plurality of patch icons; a step of displaying the color difference values represented by the patch icons in a first display format that displays, as numeric values, the color difference values within display regions of the corresponding patch icons; and a step of displaying the color difference values represented by the patch icons in a second display format that displays, as numeric values, the color difference values above display regions of a plurality of patch icons.

Also, according to another aspect of the present invention, there is provided a color difference display control apparatus comprising: an input unit adapted to input data associated with spectral reflectances of respective patches on a first measurement chart and a second measurement chart which record a plurality of color patches; a computing unit adapted to compute color difference values between the patches corresponding to identical positions on the first measurement chart and the second measurement chart based on the data input in the inputting step; an icon display unit adapted to display the plurality of computed color difference values as a plurality of patch icons; a first display unit adapted to display the color difference values represented by the patch icons in a first display format that displays, as numeric values, the color difference values within display regions of the corresponding patch icons; and a second display unit adapted to display the color difference values represented by the patch icons in a second display format that displays, as numeric values, the color difference values above display regions of a plurality of patch icons.

Furthermore, according to another aspect of the present invention, there is provided a computer-readable storage medium storing a computer program for making a computer execute a color difference display control method, said method comprising: a step of inputting data associated with spectral reflectances of respective patches on a first measurement chart and a second measurement chart which record a plurality of color patches; a step of computing color difference values between the patches corresponding to identical positions on the first measurement chart and the second measurement chart based on the data input in the inputting step; a icon displaying step of displaying the plurality of computed color difference values as a plurality of patch icons; a step of displaying the color difference values represented by the patch icons in a first display format that displays, as numeric values, the color difference values within display regions of the corresponding patch icons; and a step of displaying the color difference values represented by the patch icons in a second display format that displays, as numeric values, the color difference values above display regions of a plurality of patch icons.

Further features of the present invention will become apparent from the following description of exemplary embodiments with reference to the attached drawings.

BRIEF DESCRIPTION OF THE DRAWINGS

FIG. 4 is a table showing information included in colorimetric data according to the embodiment of the present invention;

FIG. 9 shows the overall display window according to the embodiment of the present invention;

DESCRIPTION OF THE EMBODIMENTS

Preferred embodiments of the present invention will now be described in detail with reference to the drawings. It should be noted that the relative arrangement of the components, the numerical expressions and numeric values set forth in these embodiments do not limit the scope of the present invention unless it is specifically stated otherwise.

A color evaluation system according to the present invention performs colorimetric analysis of patches respectively output from different devices, and computes and outputs color differences from their colorimetric results. Ideally, the color difference is 0. Note that patches are objects to be measured, which are prepared to evaluate color differences. Upon colorimetric analysis, two printed materials on which a plurality of patches are printed by different devices are used. Note that the two printed materials have the same layout of printed patches. That is, the different devices use the same original image data used to form patches.

Figure 1:
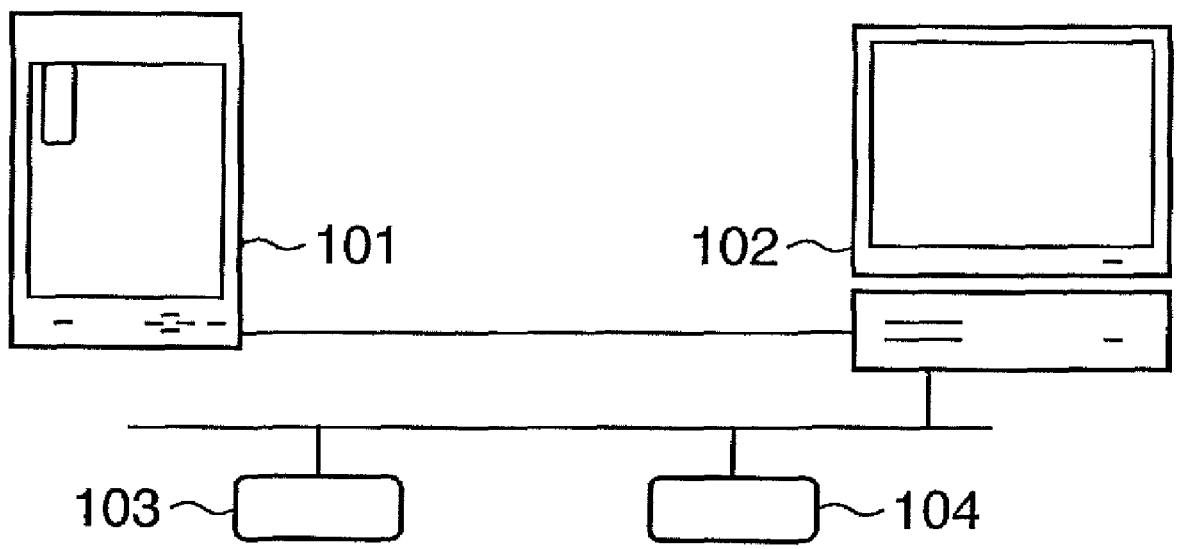
FIG. 1 is a diagram showing the system upon colorimetric according to one embodiment of the present invention.

FIG. 1 shows the system arrangement upon colorimetric analysis according to this embodiment. As an example of an image output apparatus according to this embodiment, a printer is adopted. However, an image output apparatus according to the present invention may comprise a printer, facsimile, color monitor, or the like, which handles digital color images.

The system arrangement according to this embodiment includes a colorimeter 101, a color evaluation apparatus 102 serving as a color difference display control apparatus, printers 103 and 104, and an interface 105. The colorimeter 101 measures the spectral reflectance characteristics such as the densities, absolute chromaticity, and the like of objects to be measured. The colorimeter 101 optically measures the colors of a printed material to be measured upon reception of an instruction from the color evaluation apparatus 102, and transmits colorimetric data as measurement results to the color evaluation apparatus 102. The colorimetric data include tristimulus values (X (red), Y (green), and Z (blue)), or density or LCH values (L (brightness), C (chroma), and H (hue)) of an XYZ color system, values ($L^*$ (brightness), $a^*$ (red-green axis), and $b^*$ (yellow-blue axis)) of an $L^*a^*b^*$ color system, and the like.

The color evaluation apparatus 102 determines and outputs the color difference values between patches output from the printers 103 and 104. The color evaluation apparatus 102 issues a colorimetric instruction to the colorimeter 101, and determines color differences between reference data which are measured in advance by the colorimeter 101 and are stored in itself, and colorimetric data. Of course, as reference data, colorimetric data of an arbitrary printer may be adopted.

The printers 103 and 104 output a plurality of patches, as described above, and then undergo ink or toner adjustment based on their output results. Note that the printers 103 and 104 print respective patches using the same image data. More specifically, in image data used by both the printers, respective pieces of image information such as CMYK (cyan, magenta, yellow, and black), RGB (red, green, and blue), and the like are equal to each other.

Even when a plurality of different devices (e.g., the printers 103 and 104) use identical image data, identical output results are not always obtained. This is because these devices may often have different color reproducibilities. Hence, this embodiment measures the output results from the different devices using the colorimeter 101, and determines and outputs the color difference values based on the colorimetric results. These outputs allow the operator to recognize individual differences. For example, when the operator adjusts the devices based on the results of the color difference values, the individual differences of the devices can be reduced.

This embodiment compares the color differences between patches output from the printers 103 and 104 based on identical device color data. Note that the printers 103 and 104 are connected via an interface 105. However, the system arrangement according to this embodiment does not always require connection via the interface 105, and may use patches output from external printers or colorimetric data obtained by an external colorimeter as objects to be measured.

Figure 2:
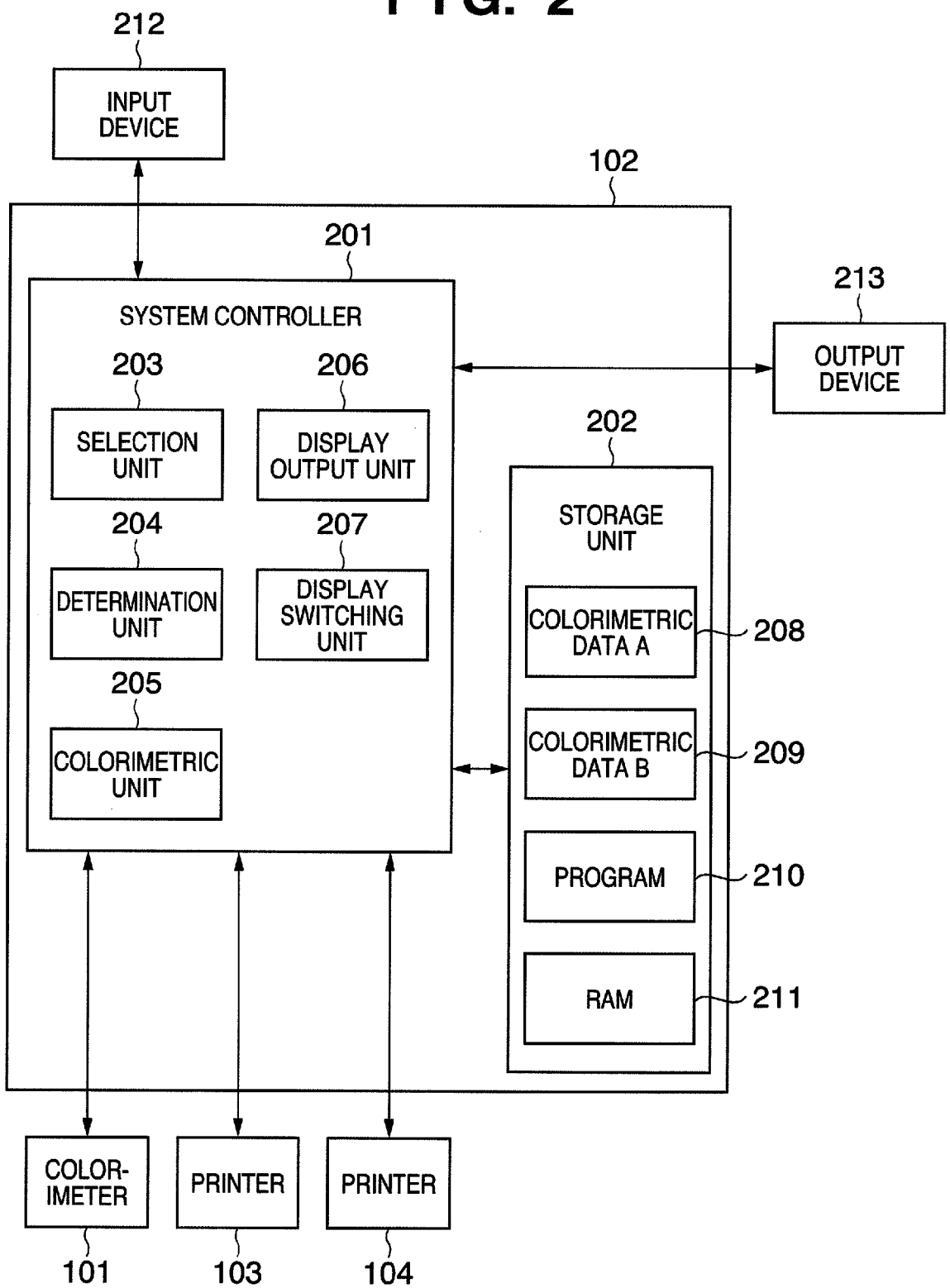
FIG. 2 is a block diagram showing a schematic arrangement of a color evaluation apparatus according to the embodiment of the present invention.

FIG. 2 is a block diagram showing a schematic arrangement of the color evaluation apparatus according to this embodiment. Note that only principal parts associated with the present invention will be described hereinafter.

The color evaluation apparatus 102 includes a system controller 201 and storage unit 202. Note that the colorimeter 101, the printers 103 and 104, an input device 212, and a display device 213 are connected to the color evaluation apparatus 102. The system controller 201 includes a selection unit 203, determination unit 204, colorimetric unit 205, display output unit 206, and display switching unit 207. The storage unit 202 includes colorimetric data A 208 of patches printed by the printer 103, and colorimetric data 209 of patches printed by the printer 104. Furthermore, the storage unit 202 includes a program 210 used to control the color evaluation apparatus 102 of this embodiment, and a RAM 211. The RAM 211 extracts data used in computing of the system controller 201 from the colorimetric data 208 and 209 and temporarily stores them.

The colorimetric unit 205 measures the printed materials printed by the printers 103 and 104 using the colorimeter 101, and stores the colorimetric data in the storage unit 202. The determination unit 204 determines the color difference values of the patches printed by the different devices using the colorimetric data 208 and 209. Note that the system controller 201 may determine, using the determination unit 204, the color difference values based on the colorimetric data measured using the colorimeter 101 and reference data pre-stored in the storage unit 202, and may store the determination results in the storage unit 202.

The display output unit 206 outputs to the display device 213 patch icons corresponding to respective patch positions and color difference values determined by the determination unit 204 onto the patch icons. That is, the display output unit 206 outputs one patch icon per patch. The display switching unit 207 switches the display format of color difference values in accordance with the size of each patch icon, e.g., the length of one side of each patch icon. The output mode of color difference values includes a first display format for displaying information of a color difference value within a display region of each patch icon, and a second display format for displaying information of a color difference value using a popup display independently of the display region of each patch icon.

The selection unit 203 recognizes information input from the operator to the color evaluation apparatus 102 via the input device 212. For example, when the operator wants to display the color difference values in the second display format, he or she selects a desired patch icon displayed on the display device 213 according to the operation of the input device 212. That is, the selection unit 203 specifies the patch icon of operator's choice based on the information input from the input device 212. After that, the display output unit outputs a color difference value of the patch icon specified by the selection unit 203 to the display device 213.

Figure 3:
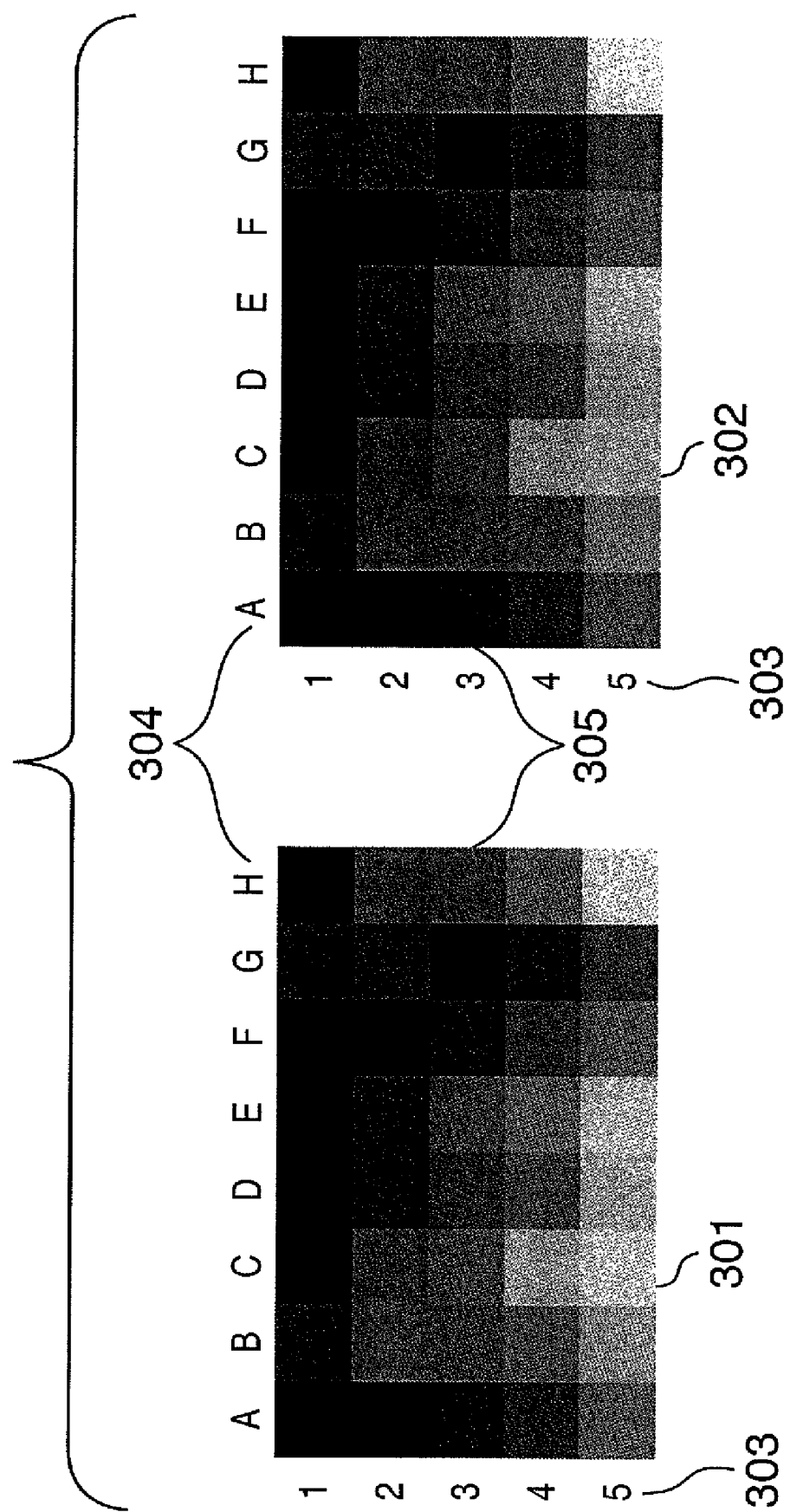
FIG. 3 shows printed materials output from different printers according to the embodiment of the present invention.

FIG. 3 shows an example of printed materials output from the different printers according to this embodiment. Note that this embodiment will explain an example in which patch patterns corresponding to the respective patches are two-dimensionally laid out and output. However, the display format of the patch patterns according to the present invention is not limited to that using the two-dimensional (2D) layout.

On printed materials 301 and 302, a plurality of color patches 305 laid out in a lattice-like pattern are printed. The color patches 305 are laid out in combinations of a row direction 303 and column direction 304. In order to identify respective rows and columns, for example, the row direction 303 may be assigned with numeric values, and the column direction 304 may be assigned with alphabets, as shown in FIG. 3. Each patch position is specified by, e.g., coordinate information like 1A. The colorimeter 101 executes colorimetric analysis for each individual patch upon colorimetric analysis. The positions of the patches printed on the printed material 301 are the same as those of the patches printed on the printed material 302.

The colorimetric unit 205 controls the colorimeter 101 to execute colorimetric analysis from the color patches 305 printed on the printed material 301. Upon completion of the colorimetric analysis, the system controller 201 stores the colorimetric data in the storage unit 202 as the colorimetric data A 208. Next, the colorimetric unit 205 executes colorimetric analysis of the color patches 305 printed on the printed material 302, and the system controller 201 stores the colorimetric data in the storage unit 202 as the colorimetric data B 209.

After that, the determination unit 204 determines the color difference values by comparing the colorimetric data for respective corresponding patches. The determined color difference values are stored in the storage unit 202.

FIG. 4 shows an example of information included in the colorimetric data according to this embodiment. Note that FIG. 4 shows, as an example, some pieces of principal information of those which are handled in this embodiment.

The colorimetric data include the number 401 of rows of patches, a colorimetric date & time 402, the number 403 of pieces of information of one patch, a type 404 of information of each patch, the number 405 of measured patches, and information 406 of respective patches. The number 401 of rows of patches indicates the number of rows of 2D patches printed by the printers 103 and 104. The colorimetric date & time 402 represents the date and time of colorimetric analysis.

The type 404 of information of each patch includes, e.g., a patch ID, and respective pieces of information of the RGB color system, XYZ color system, and L*a*b* color system, or a density, LCH, spectrum data, and the like. Note that the patch ID is identification information used to specify the row direction 303 and column direction 304 of each patch shown in FIG. 3. That is, the patch ID can specify the position of each printed patch. The number 405 of patches represents the total number of patches. The patch information 406 includes colorimetric data for each patch.

Note that FIG. 4 shows only colorimetric data which belong to column A, and merely exemplifies some colorimetric data. Of course, there are elements in columns B to H. That is, corresponding colorimetric data for all the plurality of patches as objects to be measured are included.

Figure 5:
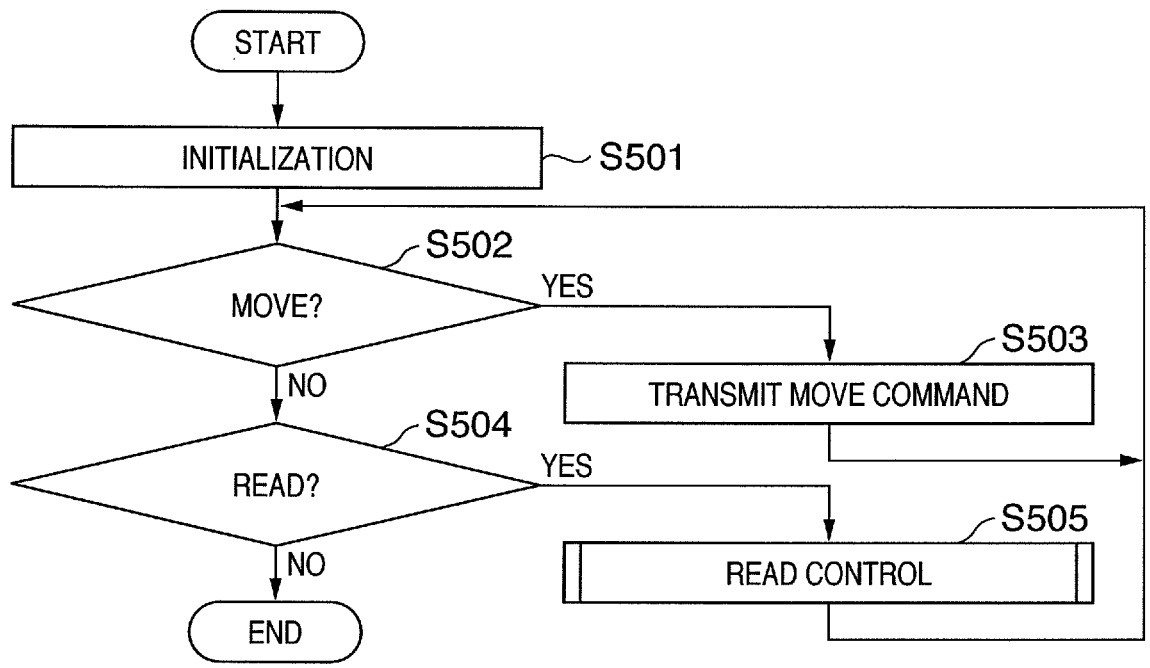
FIG. 5 is a flowchart showing colorimetric control for a colorimeter of the color evaluation apparatus according to the embodiment of the present invention.

FIG. 5 is a flowchart showing colorimetric control for the colorimeter of the color evaluation apparatus according to this embodiment. In step S501, the colorimetric unit 205 initializes the colorimeter 101. The colorimetric unit 205 checks in step S502 if the colorimeter 101 is to be moved to a position above the patch to be measured. The colorimeter 101 is attached to, e.g., an XY stage, and is movable in the X- and Y-axis directions in accordance with a move instruction from the colorimetric unit 205. If the colorimeter 101 is to be moved, the colorimetric unit 205 transmits a move command having a destination position (coordinate data and the like) to the colorimeter 101 in step S503. After that, the colorimetric unit 205 returns the process to step S502.

On the other hand, if the colorimeter 101 is not to be moved, the colorimetric unit 205 checks in step S504 if a patch is to be read. Note that the colorimetric unit 205 skips read control based on the position information of the colorimeter 101 if the colorimeter 101 exists on the already read patch or if the colorimeter 101 has not been moved to a position above the patch to be measured. Upon reading a patch, the colorimetric unit 205 executes the read control to make the colorimeter 101 measure the patch in step S505. The read control will be described in detail later using FIG. 6. After the read control, the colorimetric unit 205 returns the process to step S502. If the read control of the colorimeter 101 is skipped, the colorimetric unit 205 ends the processing. Note that the colorimetric unit 205 repeats the processes in steps S502 to S505 until all the patches are measured.

Figure 6:
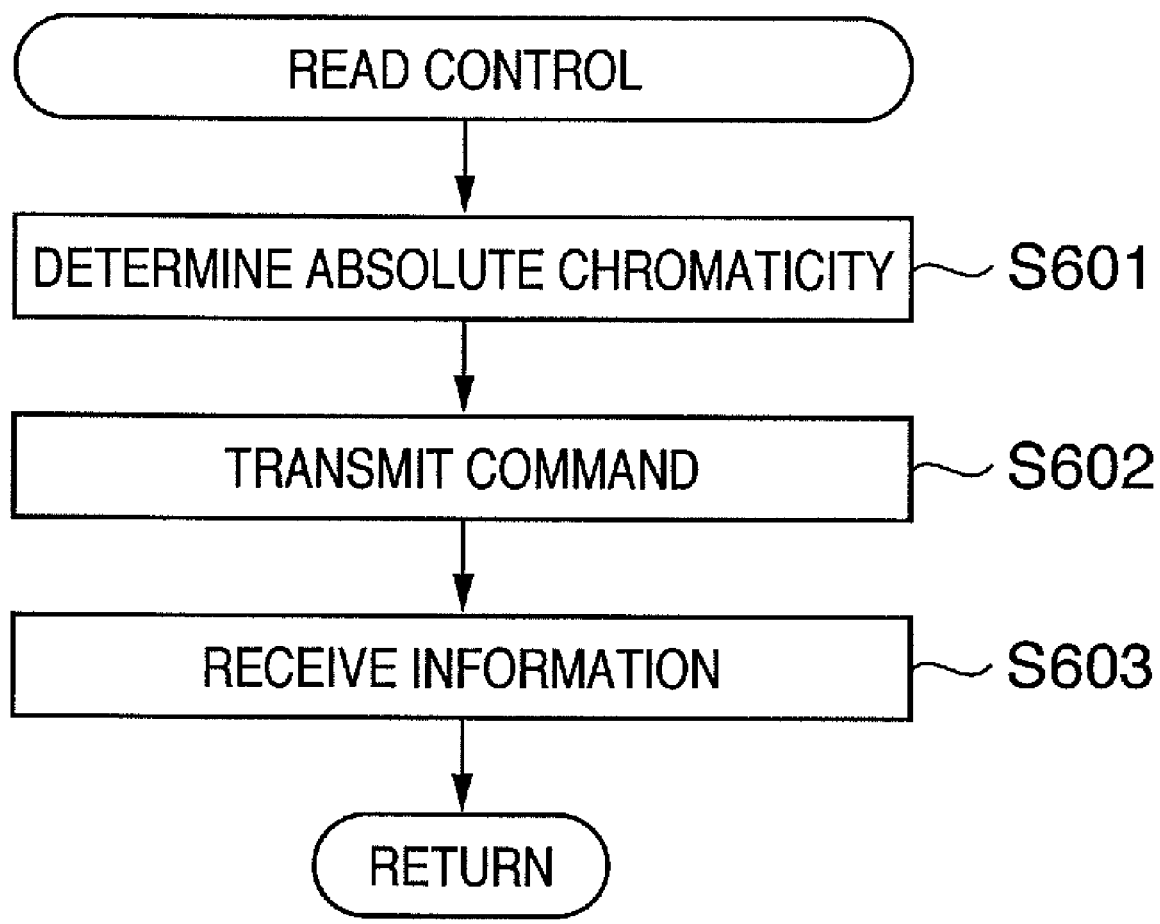
FIG. 6 is a flowchart showing patch read control for the colorimeter of the color evaluation apparatus according to the embodiment of the present invention.

FIG. 6 is a flowchart showing read control of patches for the colorimeter of the color evaluation apparatus according to this embodiment.

In step S601, the colorimetric unit 205 determines an absolute chromaticity to be received from the colorimeter 101 of a plurality of absolute chromaticity. In step S602, the colorimetric unit 205 transmits a command to read the determined absolute chromaticity to the colorimeter 101. In step S603, the colorimetric unit 205 receives colorimetric data read from each patch from the colorimeter 101, and ends the read control. After completion of the read control, the colorimetric unit 205 may store the colorimetric data received from the colorimeter 101 in the storage unit 202. The colorimetric data stored in the storage unit 202 serves as reference data upon colorimetric analysis of the patch to be compared. Note that the same read control applies to colorimetric analysis of the patch to be compared.

Figure 7:
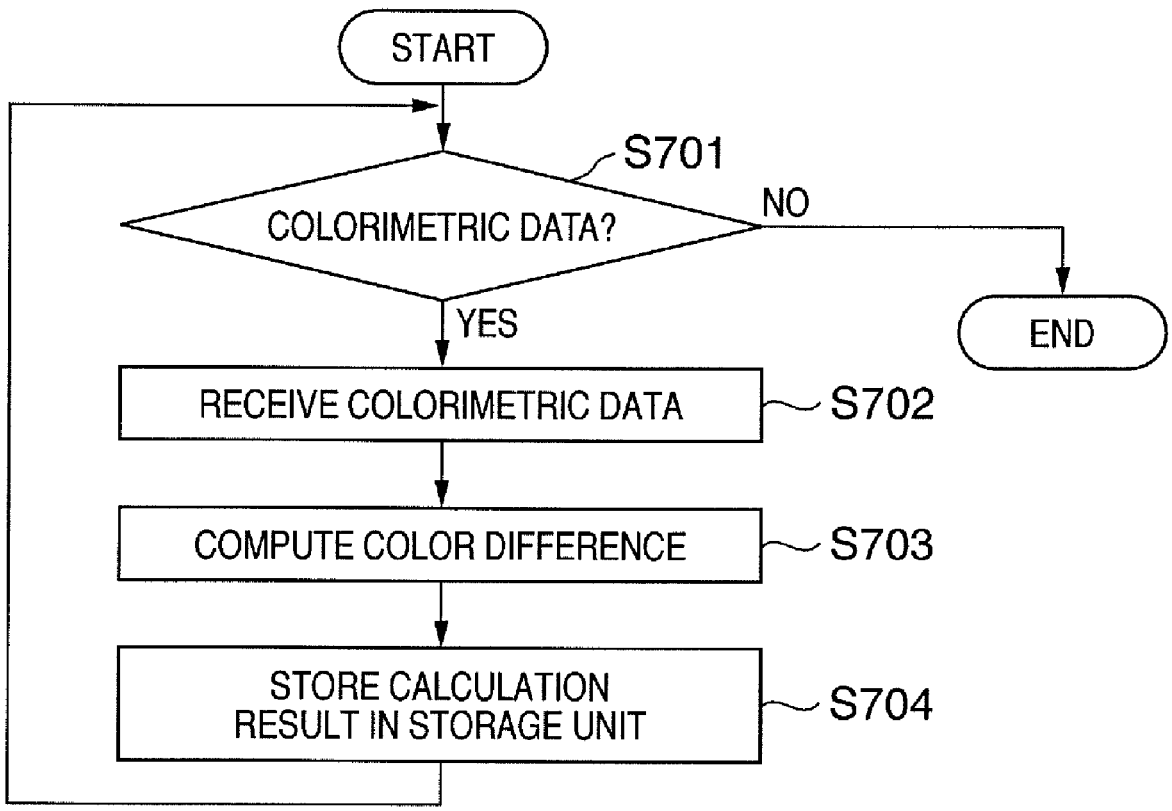
FIG. 7 is a flowchart showing control for determining color difference values by the color evaluation apparatus according to the embodiment of the present invention.

FIG. 7 is a flowchart showing control for determining the color difference values by the color evaluation apparatus according to this embodiment. This embodiment will explain control of the determination unit 204 that determines color difference values. However, this control may be executed in the colorimetric control described using FIG. 6.

The determination unit 204 checks in step S701 if there is colorimetric data to be received from the colorimeter 101. For example, the determination unit 204 executes this checking processing based on information (e.g., a status flag indicating colorimetric completion/incompletion of the colorimeter 101 or the like) from the colorimetric unit 205. In this case, the determination unit 204 may directly inquire the colorimeter 101 of the presence/absence of colorimetric data. As a result of checking, if there is colorimetric data to be received, the process advances to step S702, and the determination unit 204 receives colorimetric data from the colorimeter 101. On the other hand, if there is no data to be received, the determination unit 204 ends the determination control of the color difference values.

In step S703, the determination unit 204 reads out reference data which is measured in the colorimetric control processing shown in FIG. 5 and is pre-stored in the storage unit 202. Furthermore, the determination unit 204 determines a color difference value by comparing the colorimetric data to be compared and corresponding colorimetric data read out from the storage unit 202. Finally, in step S704 the determination unit 204 stores the determined color difference value, and the corresponding patch position in the storage unit 202. The determination unit 204 repeats steps S701 to S704 until it determines the color difference values of all the patches, and ends the processing if no colorimetric data to be received remains.

Figure 8:
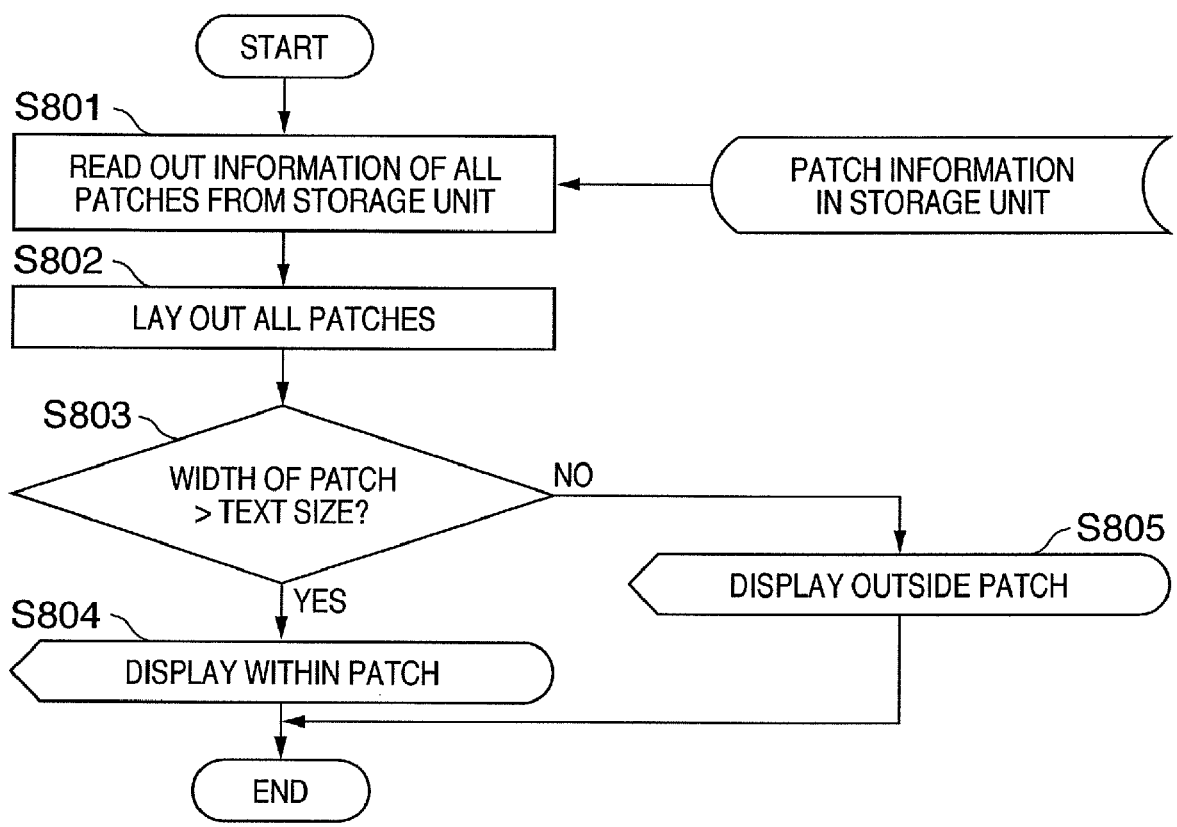
FIG. 8 is a flowchart showing control for outputting colorimetric results according to the embodiment of the present invention.

FIG. 8 is a flowchart showing control for outputting the colorimetric results according to this embodiment. In step S801 the display output unit 206 reads out the positions and color difference values of respective patches, and the absolute chromaticity from the storage unit 202. In step S802, the display output unit 206 lays out patch icons corresponding to all the patches. In step S803, the display switching unit 207 compares the width of each patch icon laid out by the display output unit 206 and the text size (font size or the like) of colorimetric data corresponding to that patch icon.

If the width of the patch icon is larger than the text size, the display switching unit 207 controls to display the color difference values in the first display format in step S804. The first display format displays the color difference values within the display regions of the patch icons.

On the other hand, if the width of the patch icon is equal to or smaller than the text size, the display switching unit 207 controls to display the color difference values in the second display format in step S805. The second display format displays information of the color difference values above the display regions of a plurality of patch icons independently of the display regions of the patch icons. Note that the second display format is preferably applied when the operator selects an arbitrary patch icon via the input device 212.

In this way, even when the total number of patches is large and it is difficult to display the color difference values, the color evaluation apparatus according to this embodiment can identifiably display the color difference values. As described above, originally, it is preferable for the operator to confirm the respective color difference values of all the patches at one time. For this reason, the color evaluation apparatus of this embodiment may select the output mode to display the color difference values in the first display format as long as the color difference values can be suitably displayed within the display regions of the patch icons.

Figure 9:
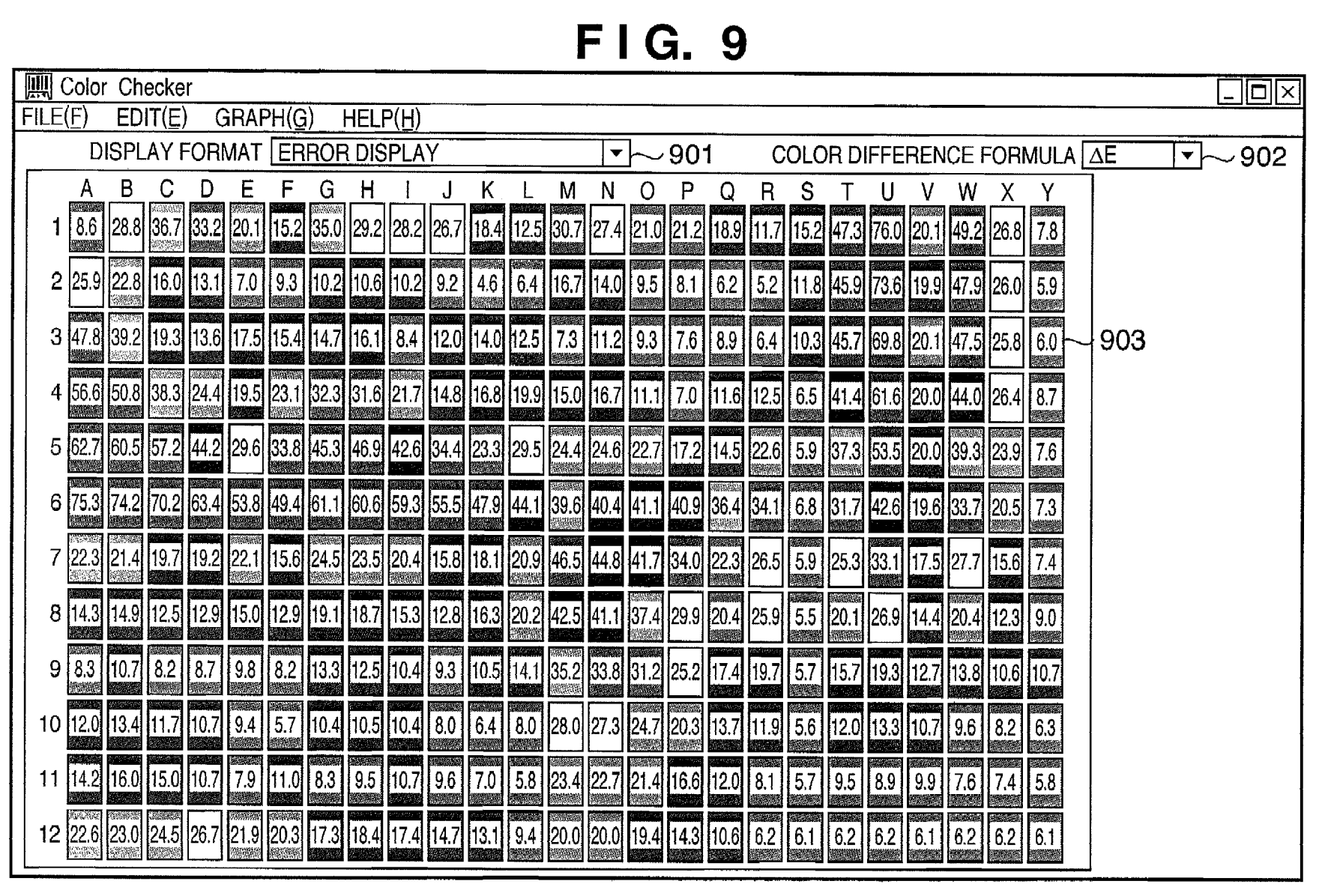

FIG. 9 shows the overall display window according to this embodiment. As shown in FIG. 9, this color evaluation apparatus displays the color-coded patch icons. The coded colors correspond to a plurality of thresholds used to classify the color difference values determined by the determination unit 204. Note that the system controller 201 may determine the ranges of colors to be output in accordance with information input by the operator. For example, the system controller 201 displays patch icons which have color difference values ranging from 0.0 to 5.0 (both inclusive) in light blue. The controller 201 displays patch icons which have color difference values ranging from 5.1 to 10.0 (both inclusive) in blue. The controller 201 displays patch icons which have color difference values ranging from 10.1 to 15.0 (both inclusive) in yellow. The controller 201 displays patch icons which have color difference values ranging from 15.1 to 20.0 (both inclusive) in red. In this way, the controller 201 may color-code the color difference values in increments of 5.0. In this way, the operator can easily visually recognize color difference value differences.

The operator can select, e.g., error display (color difference value) or absolute chromaticity display via a pull-down menu 901 used to select a display format. The operator also select one of ΔE, ΔL*, Δa*, Δb*, ΔL, ΔC, and ΔH via a pull-down menu 902 used to select a color difference formula. The determination unit computes a color difference based on the color difference formula selected via the pull-down menu 902 of the color difference formula. Note that a color difference ΔE is determined based on, e.g., the following formula:

$$\Delta E = ((\Delta L^*)^2 + (\Delta a^*)^2 + (\Delta b^*)^2)^{1/2}$$

If each patch icon has an output size large enough to allow the operator to sufficiently visually recognize the text size of each color difference value, the text data indicating the color difference values are displayed in the first display format, as shown in FIG. 9.

The second display format will be described below using FIGS. 10 to 17. Note that the following description will be given taking a mouse as an example of the input device according to this embodiment. However, the input device according to the present invention can adopt any other pointing devices as long as the operator can operate a pointer displayed on the display device.

Figure 10:
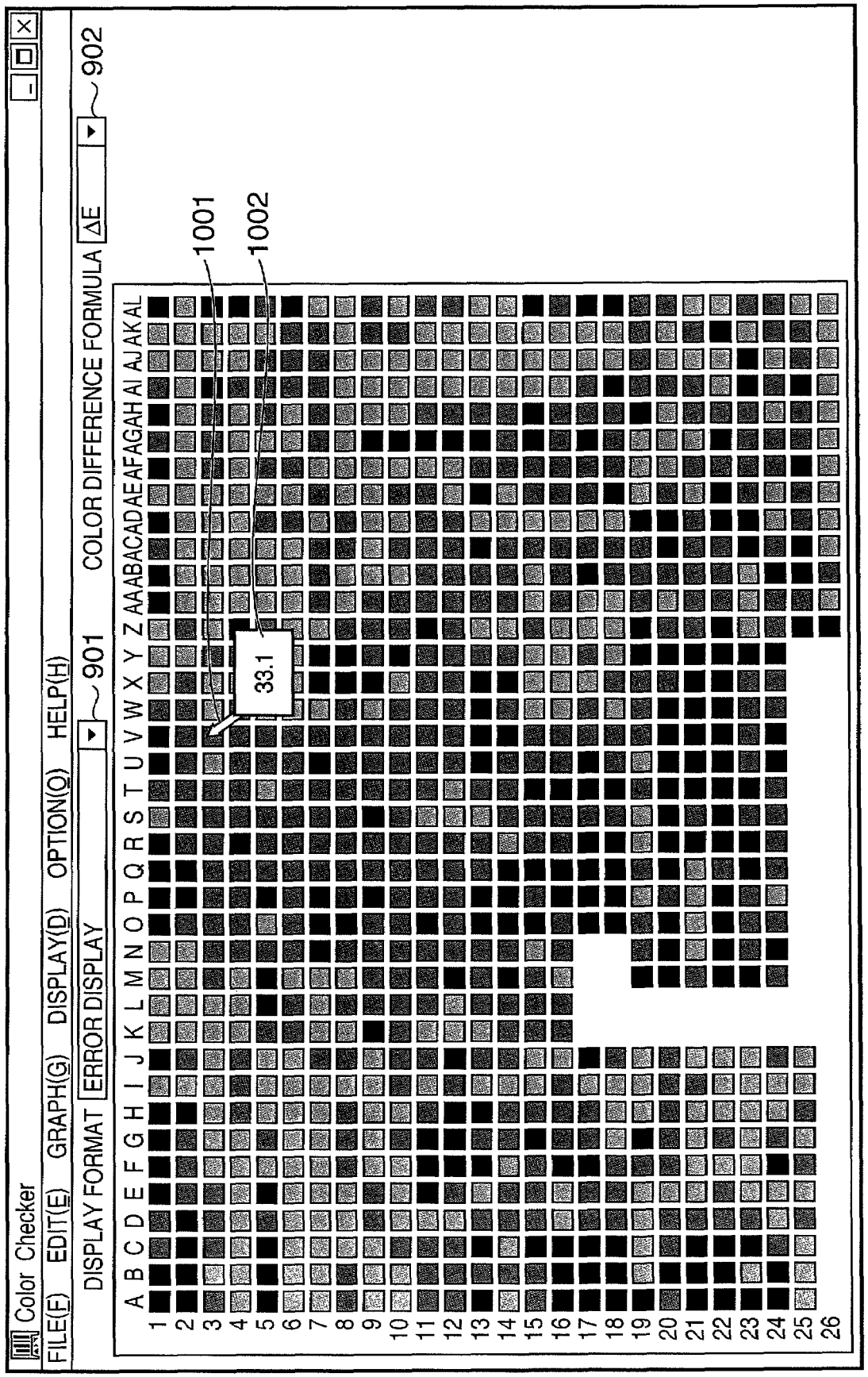
FIG. 10 shows the overall display window according to the embodiment of the present invention.

FIG. 10 shows the overall display window according to this embodiment. As shown in FIG. 10, if the total number of patches is large, the width of each patch icon becomes smaller than the text size that indicates a color difference value, and the color difference value cannot be displayed within the display region of that patch icon to be large enough to be sufficiently visually recognized. For this reason, the invention for outputting the color difference values in the second display format when the total number of patches or corresponding patch icons exceeds a predetermined threshold will be described below. In such case, display of the color difference values is preferably omitted for non-selected patch icons. This is because significance to display information which cannot be sufficiently recognized is poor and such display is wasteful.

The operator operates a pointer 1001 using the mouse or the like. An enlarged display window 1002 displays the color difference value of a given patch icon displayed on the display device onto which the operator has moved the pointer 1001. Note that the enlarged display window 1002 is popup-displayed independently of the display region of one patch icon of interest. In this way, the enlarged display window 1002 can display text indicating the color difference value to have a sufficiently recognizable size. Furthermore, display of the enlarged display window 1002 is canceled after an elapse of a predetermined period of time. That is, the enlarged display window 1002 may be automatically cleared from the display screen. Alternatively, the display output unit 206 may cancel display of the enlarged display window 1002 when the operator moves the pointer 1001 from the display regions of the corresponding patch icon and the enlarged display window 1002.

Figure 11:
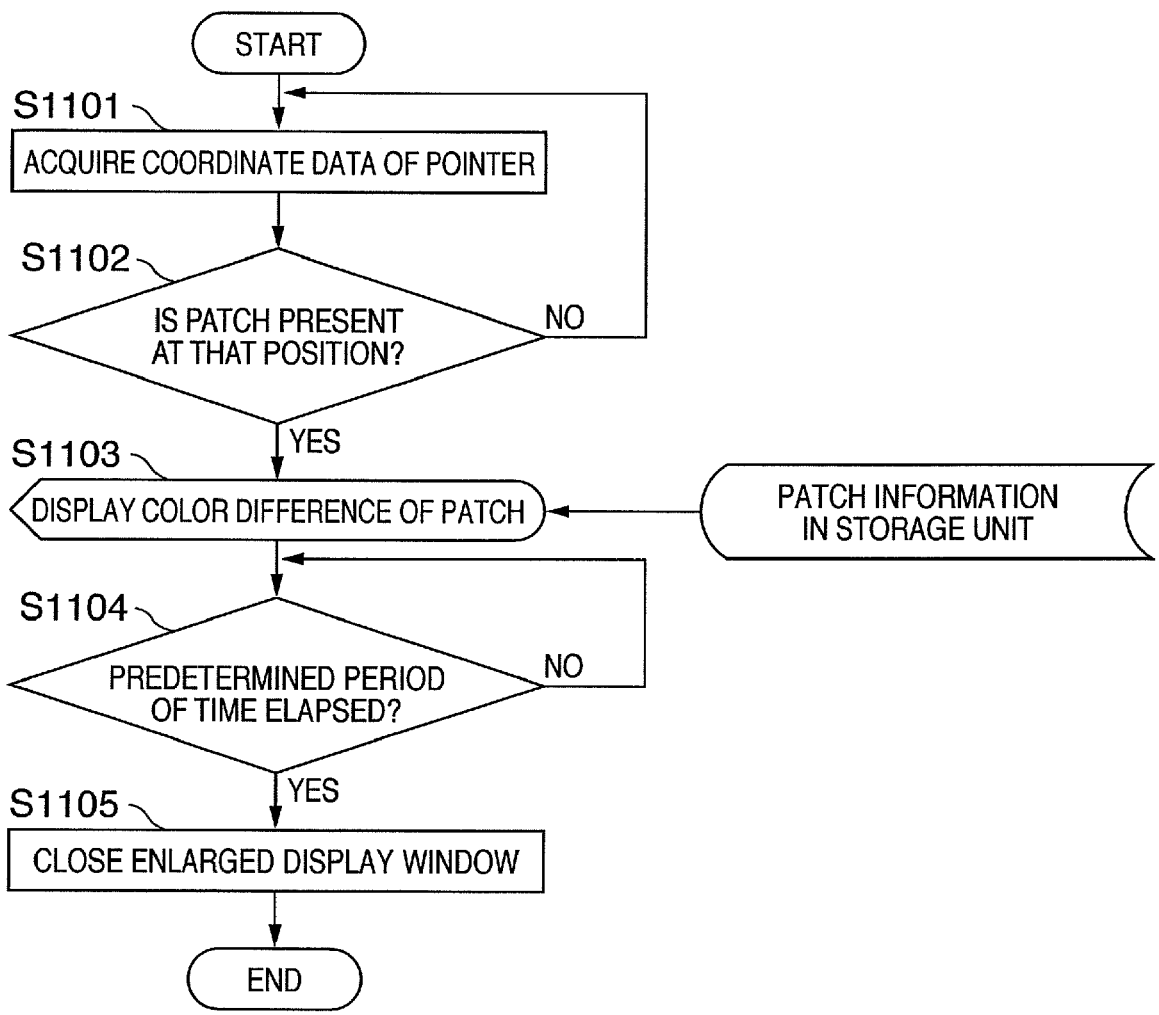
FIG. 11 is a flowchart showing the display control of color difference values according to the embodiment of the present invention.

FIG. 11 is a flowchart showing the display control of the color difference values according to this embodiment. In step S1101, the selection unit 203 determines coordinate data of the pointer 1001 which has been moved by the operation of the operator. The selection unit 203 checks based on the determined coordinate data in step S1102 if a patch icon is displayed on the coordinates where the pointer 1001 is located. If a patch icon is not displayed, the selection unit 203 periodically acquires the coordinate data of the pointer 1001. After that, if it is confirmed that a patch icon is displayed, the selection unit 203 advances the process to step S1103.

In step S1103, the display output unit 206 reads out the color difference value of the patch of interest from the storage unit 202, and displays the enlarged display window 1002 and the color difference value. At this time, the color difference value is displayed within the display region of the enlarged display window 1002. The display output unit 206 repetitively checks in step S1104 if a predetermined period of time elapses since the enlarged display window 1002 was displayed, until the predetermined period of time has elapsed. In step S1105, the display output unit 206 cancels display of the displayed enlarged display window 1002 and color difference value after an elapse of the predetermined period of time since display of the enlarged display window 1002 and color difference value.

Figure 12:
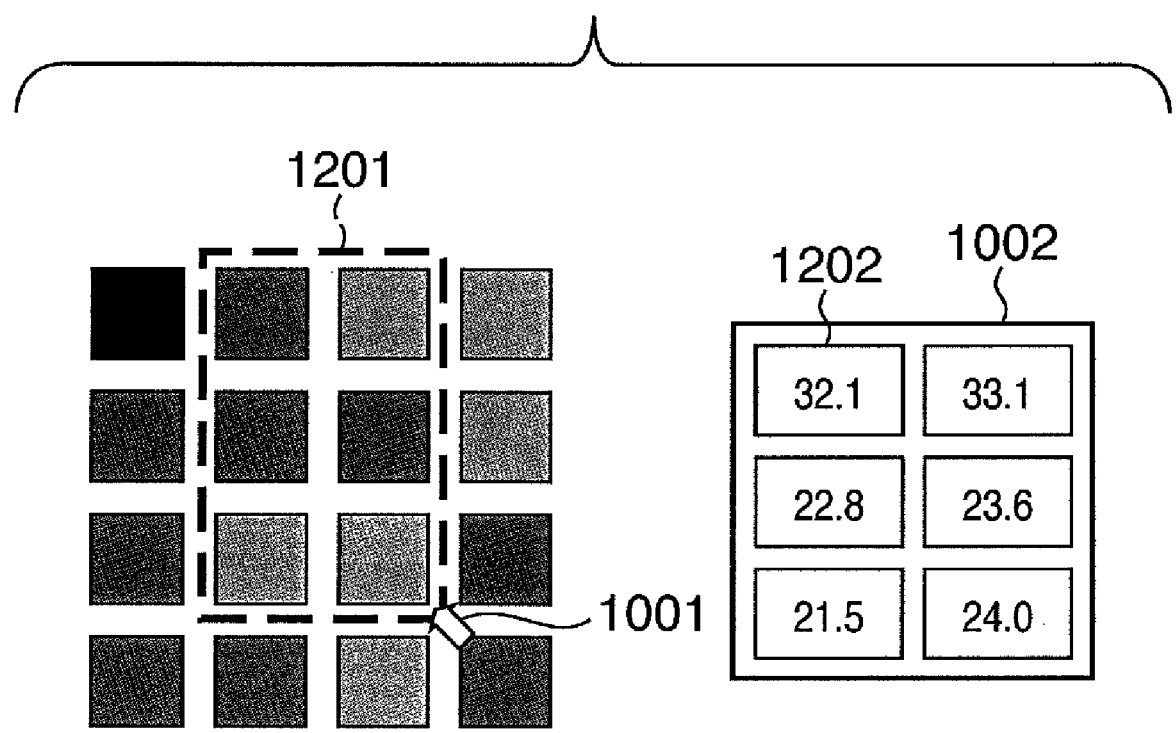
FIG. 12 is an enlarged view partially showing the display window according to the embodiment of the present invention.

FIG. 12 is an enlarged view partially showing the display window according to this embodiment. A case will be described below wherein the operator selects a plurality of neighboring patch icons.

A selected region 1201 is selected when the operator drags the displayed pointer 1001 using the mouse or the like. That is, the selection unit 203 recognizes that the operator has selected one or more patch icons included in the selected region 1201. The enlarged display window 1002 displays color difference values 1202 of respective patches in correspondence with the positions of the plurality of patch icons selected by the operator.

Figure 13:
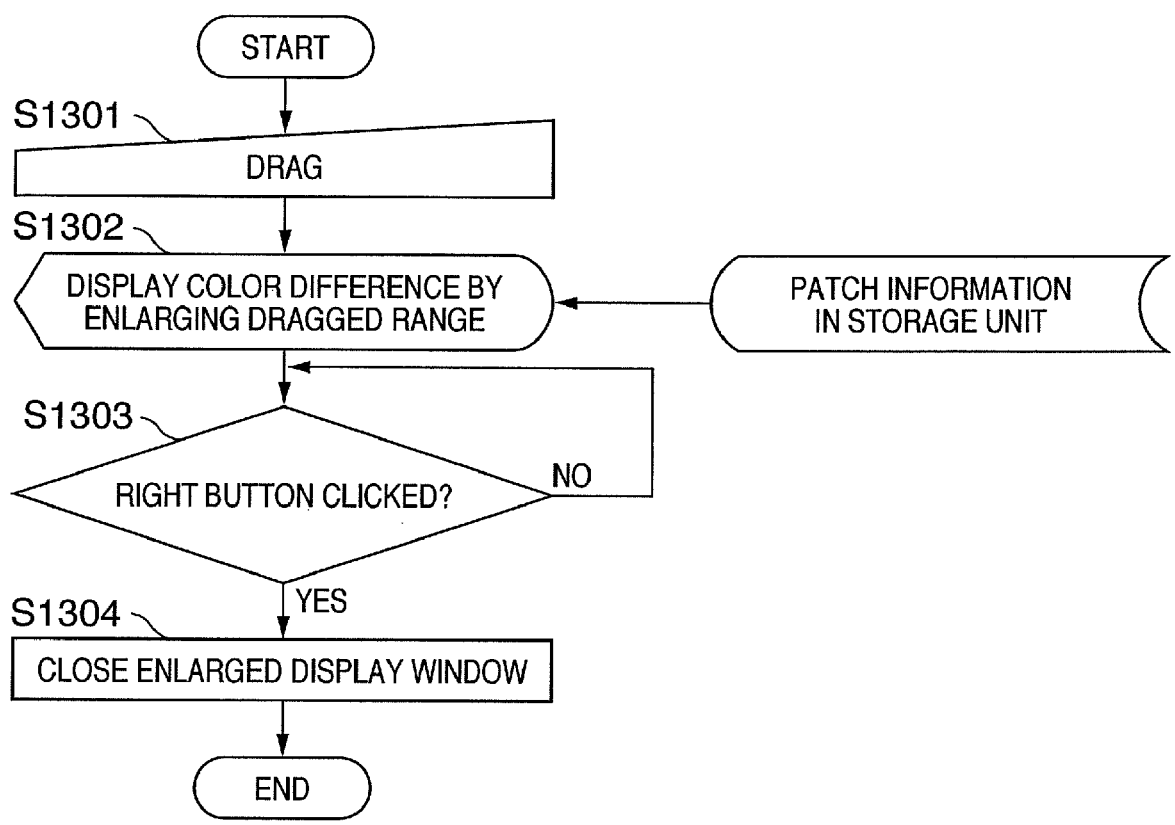
FIG. 13 is a flowchart showing the display control of color difference values according to the embodiment of the present invention.

FIG. 13 is a flowchart showing the display control of the color difference values according to this embodiment. In step S1301, the selection unit 203 receives information indicating that the operator has made a dragging operation, recognizes the selected region 1201, and specifies one or more patch icons included in the recognized selected region 1201. Note that the present invention is more effective when two or more patch icons are selected.

In step S1302, the display output unit 206 reads out the color difference values corresponding to the selected patch icons from the storage unit 202, and displays the readout color difference values on respective regions on the enlarged display window 1002. Note that the regions of the enlarged display window 1002 are displayed at positions where the correspondence between the color difference values and patch icons can be recognized.

The selection unit 203 checks in step S1303 if the operator has clicked the mouse right button within the display region of the enlarged display window 1002. If the operator has clicked the mouse right button, the display output unit 206 cancels display of the enlarged display window 1002 and color difference values in step S1304. Of course, the display output unit 206 may count an elapsed time period since display of the enlarged display window 1002 using a counter, and may cancel display of the enlarged display window 1002 after an elapse of a predetermined period of time. In this case, the need for clicking the mouse right button by the operator can be obviated, thus providing a merit.

Figure 14:
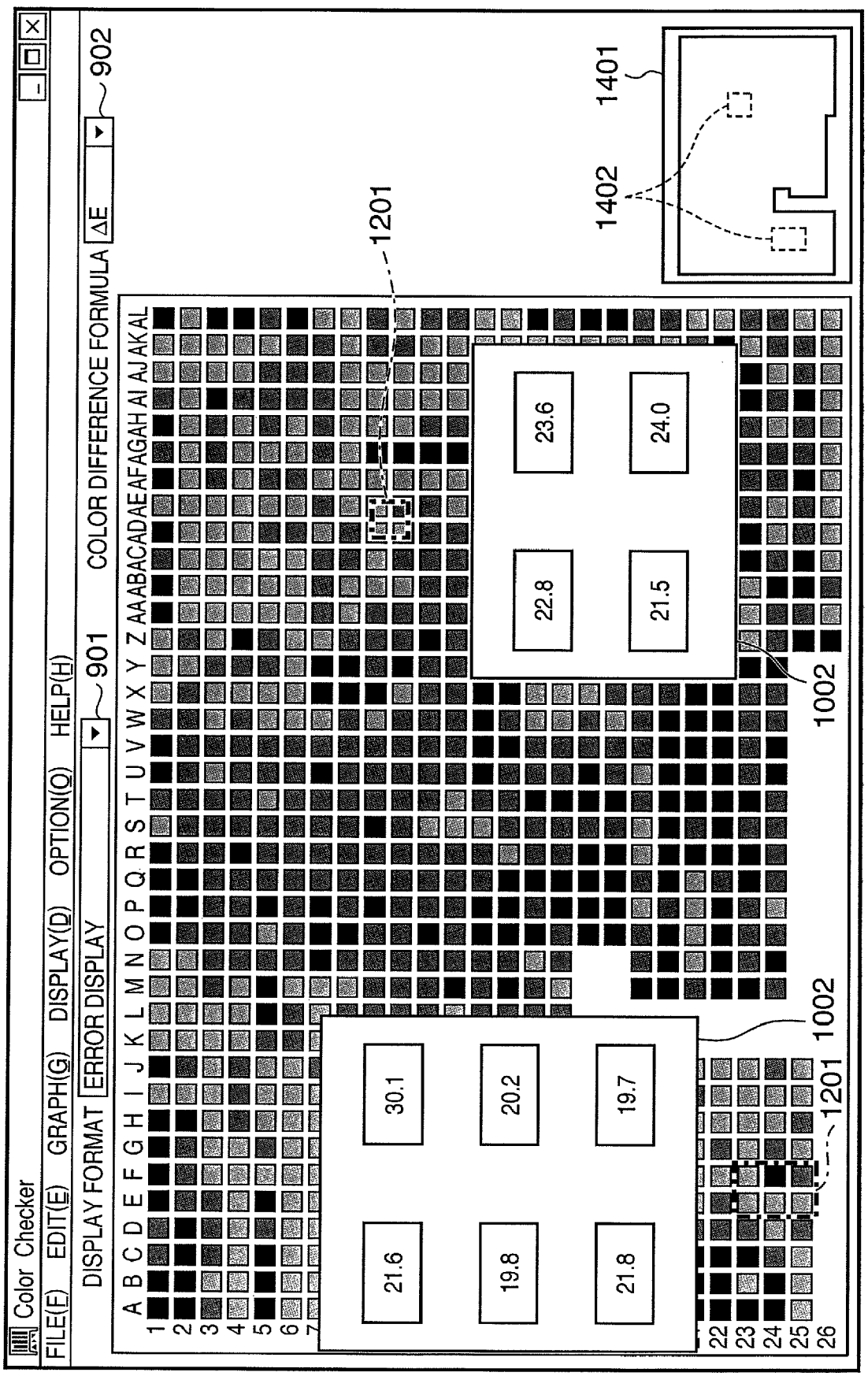
FIG. 14 shows the overall display window according to the embodiment of the present invention.

FIG. 14 shows the overall display window according to this embodiment. As shown in FIG. 14, a plurality of enlarged display windows 1002, which displays patch icons and color difference values in an enlarged scale, can be simultaneously displayed unless the operator has right-clicked to close them.

The display window according to this embodiment may include a selected region chart 1401. The selected region chart 1401 is provided to allow the operator to easily recognize the positions of patch icons corresponding to the currently displayed enlarged display windows 1002 with respect to all the patch icons. Selected region frames 1402 in the selected region chart 1401 indicate the positions of patch icons corresponding to the currently displayed enlarged display windows 1002. Note that the plurality of selected region frames 1402 are preferably color-coded to improve visibility. In this manner, the operator can easily recognize correspondence between the color difference values and patch icons which are displayed in an enlarged scale even when the plurality of enlarged display windows 1002 overlap each other.

Figure 15:
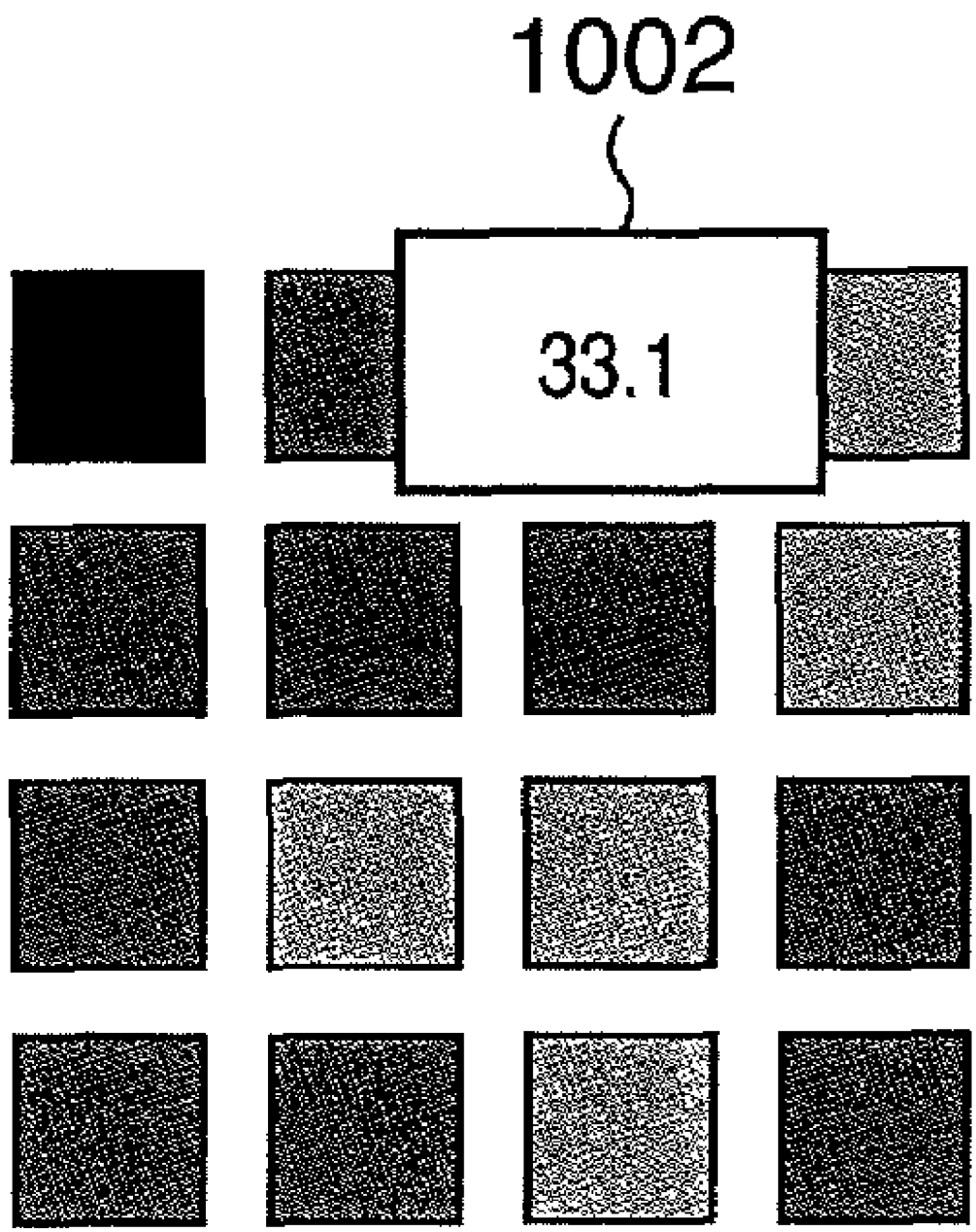
FIG. 15 partially shows the display window according to the embodiment of the present invention.

FIG. 15 partially shows the display window according to this embodiment. A case will be described using FIG. 15 wherein the color difference value of a patch corresponding to a specific patch icon for which the operator clicked the mouse right button is to be displayed. In this way, the operator can select a plurality of non-neighboring patch icons.

As shown in FIG. 15, when the operator selects an arbitrary patch icon by clicking the mouse right button, the display output unit 206 reads out a color difference value corresponding to the selected patch icon from the storage unit 202, and displays it within the enlarged display window 1002. Note that the enlarged display window 1002 has a display region which is independent from that of the selected patch icon and matches the text size of the color difference value.

Figure 16:
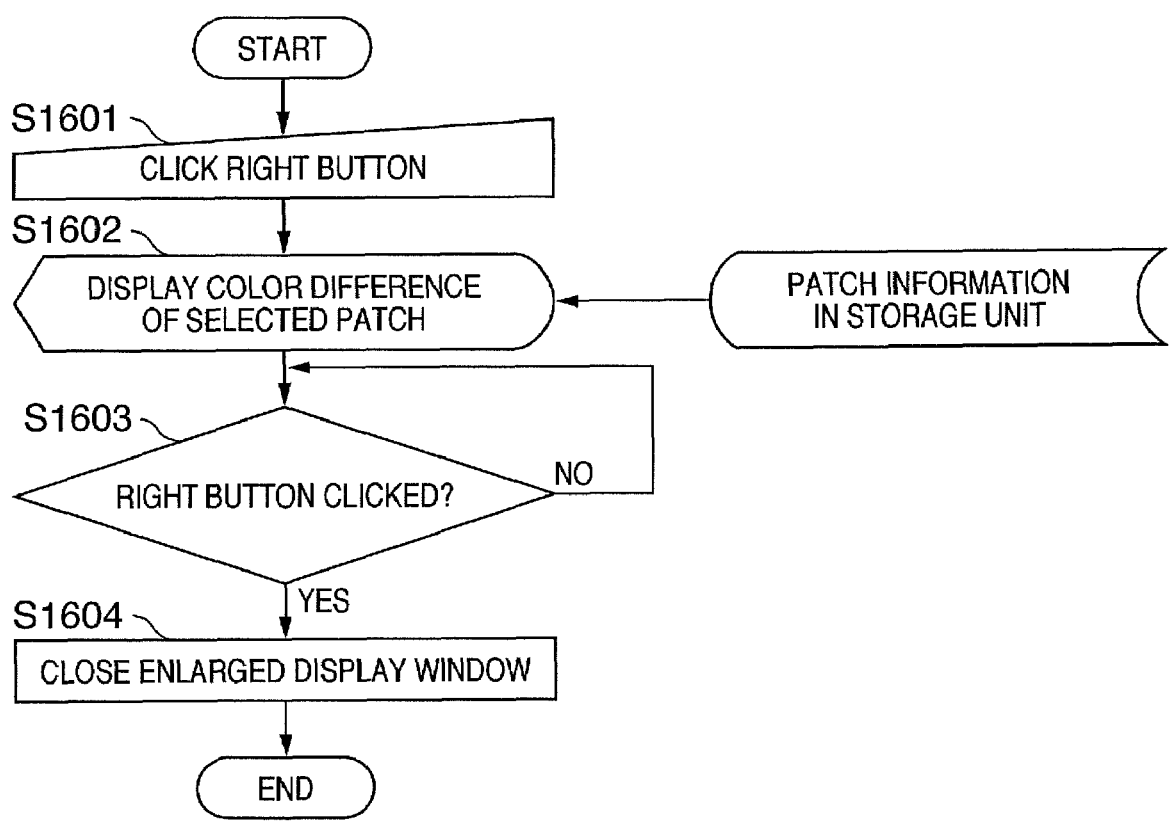
FIG. 16 is a flowchart showing the display control of color difference values according to the embodiment of the present invention.

FIG. 16 is a flowchart showing the display control of the color difference values according to this embodiment. In step S1601, the selection unit 203 specifies a patch icon selected by the operator based on information from the input device. Next, in step S1602 the display output unit 206 reads out a color difference value corresponding to the selected patch icon from the storage unit 202, and outputs the enlarged display window 1002 and the color difference value to be displayed within the enlarged display window 1002.

The selection unit 203 checks in step S1603 if the operator has selected the interior of the display region of the enlarged display window 1002 by clicking the mouse right button. That is, the selection unit 203 monitors the presence/absence of clicking of the mouse right button. If the operator has clicked the mouse right button in the display region, the display output unit 206 cancels displays of the enlarged display window 1002 and color difference value in step S1604.

Figure 17:
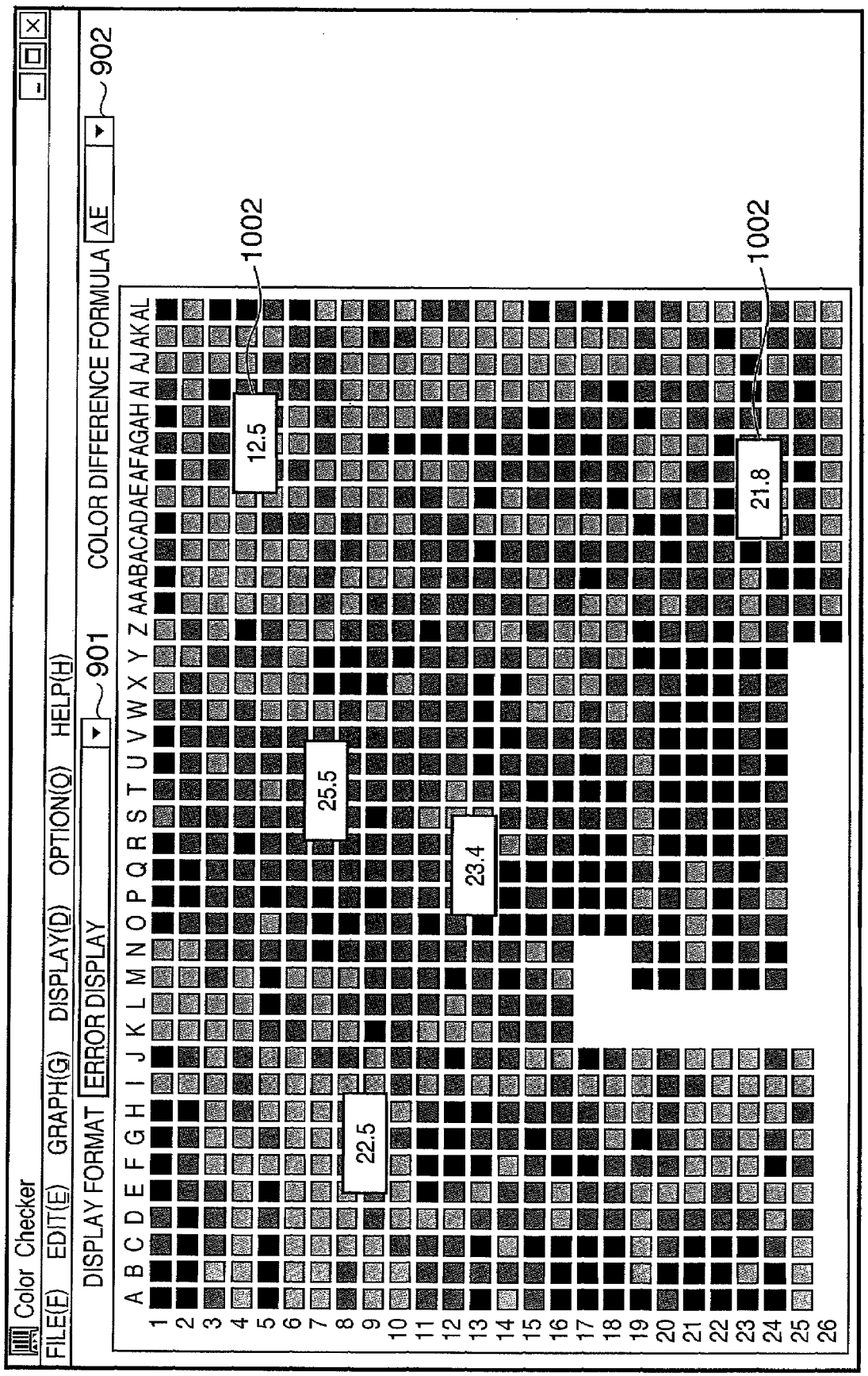
FIG. 17 shows the overall display window according to the embodiment of the present invention.

FIG. 17 shows the overall output window according to this embodiment. As shown in FIG. 17, a plurality of enlarged display windows 1002 can be displayed at the same time. In this manner, the operator can select a plurality of non-neighboring patch icons. Therefore, the operator can recognize the color difference value for each selected patch.

When the operator wants to evaluate the color differences between the patches printed by the different printers 103 and 104, he or she need to compare the patches based on a plurality of pieces of information. This is because there are various color systems, and there also are various parameters that represent colors on each color system. For this reason, the present invention may allow the operator to select the types of some pieces of information including a plurality of color difference values and absolute chromaticity as the colorimetric results. Hence, the operator can select desired information from the plurality of color difference values and absolute chromaticity.

Figure 18:
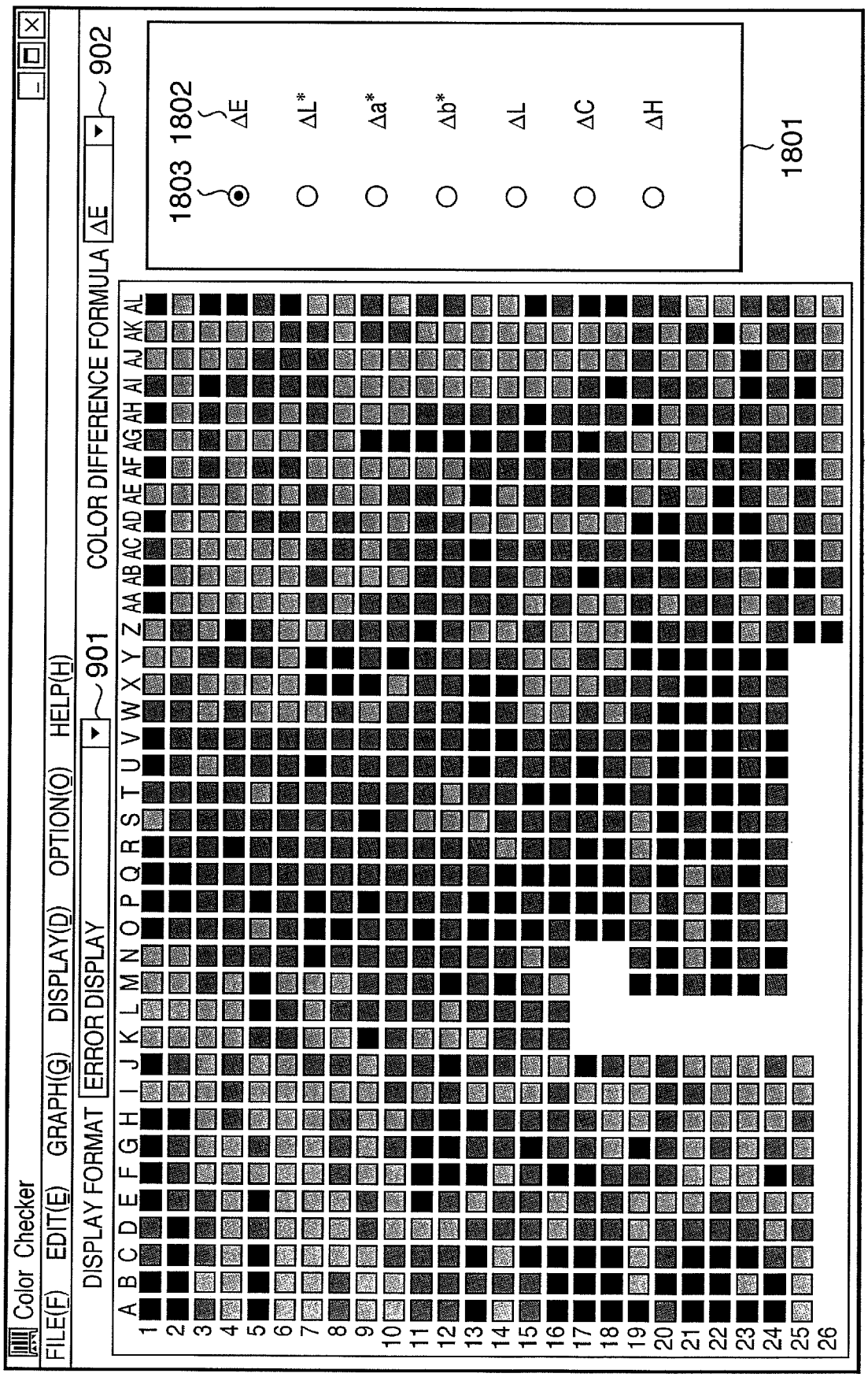
FIG. 18 shows a state in which a certain type of color difference value is selected on the display window according to the embodiment of the present invention.
Figure 19:
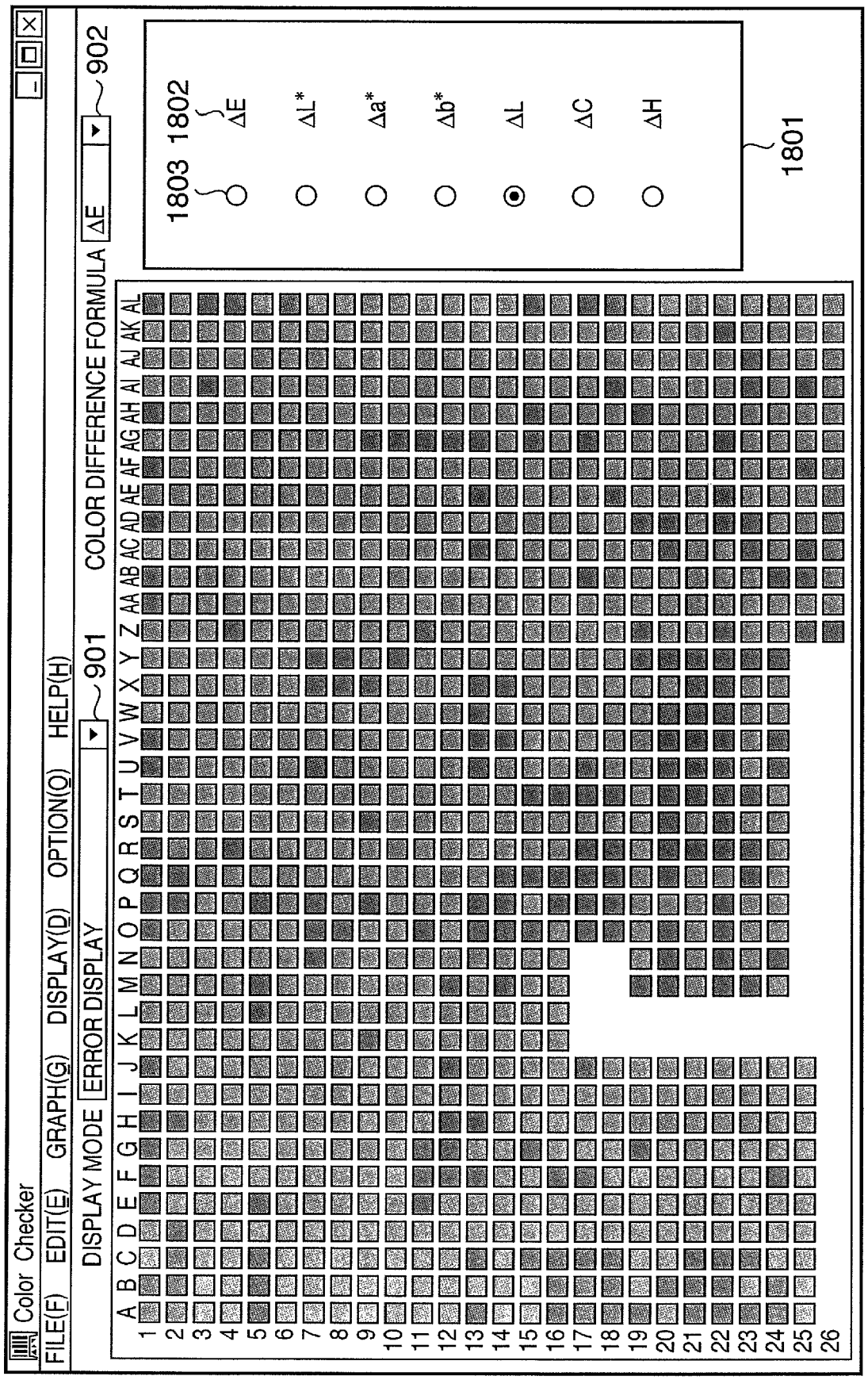
FIG. 19 shows a state in which a certain type of color difference value is selected on the display window according to the embodiment of the present invention.

FIGS. 18 and 19 show the selection states of the types of color difference values on the display window according to this embodiment. FIG. 18 shows a state wherein the operator selects information of ΔE, and respective patch icons are color-coded in accordance with the color difference value of interest. FIG. 19 shows a state wherein the operator ΔL and respective patch icons are color-coded in accordance with the color difference value of interest.

A color difference value selection window 1801 has text strings 1802 indicating the types of information, and selection buttons 1803 corresponding to the text strings 1802. Each selection button 1803 can be implemented by a radio button. The operator can easily select a desired color difference value by clicking the selection button 1803 corresponding to the text string 1802 indicating the type of color difference value. The color evaluation apparatus according to the present invention displays color difference values in the first or second display format of this embodiment in accordance with the selected color difference value.

As described above, the color difference display control method according to this embodiment includes an inputting step of inputting data associated with spectral reflectances of patches of first and second measurement charts that record a plurality of color patches. The color difference display control method also includes a computing step of computing color difference values between patches corresponding to identical positions on the first and second measurement charts based on the data input in the inputting step, and an icon displaying step of displaying the plurality of computed color difference values as a plurality of patch icons. The color difference display control method includes a first displaying step of displaying the color difference values represented by the patch icons in a first display format that displays, as numeric values, the color difference values in display regions of the corresponding patch icons. The color difference display control method includes a second displaying step of displaying the color difference values represented by the patch icons in a second display format that displays, as numeric values, the color difference values above display regions of a plurality of patch icons. The color difference display control method includes a numeric value displaying step of selecting one of the first and second display formats and displaying the numeric values in the display regions of the patch icons. Therefore, upon handling patches exceeding a predetermined number in case of color evaluation, the color difference values can be displayed in an appropriate display format in accordance with the size of each patch icon displayed on the display device. Therefore, the visibility of the display result can improve.

Note that the present invention is not limited to the above embodiment, and allows various modifications. For example, the display control method of this embodiment may display, as a numeric value, a color difference value represented by each patch icon using a popup window in the numeric value displaying step. In this way, the visibility of the color difference value of each individual patch can improve in the second display format in accordance with the display size of the patch icon. Since the color difference values are displayed in an optimal display format in accordance with the total number of patches or patch icons, the visibility of the colorimetric results can improve.

The display control method of this embodiment may further include a selecting step of selecting a patch icon, the color difference value of which is to be displayed in the second display format, of the plurality of patch icons. In this case, the icon displaying step may display the color difference value indicated by the patch icon selected in the selecting step in the second display format. In this way, the icon displaying step can display the color difference value corresponding to the selected patch icon in the second display format. Therefore, since the operator can easily acquire desired information, a user-friendly operation system can be provided.

The selecting step of this embodiment may select two or more neighboring or non-neighboring patch icons of the plurality of patch icons. Therefore, since the operator can select a plurality of patch icons at the same time, he or she can compare the color difference values of a plurality of desired patches. Therefore, the color evaluation efficiency of the operator can improve.

The icon displaying step of this embodiment may cancel numeric value display of the color difference value after an elapse of a predetermined period of time since the color difference value represented by the patch icon selected in the selecting step is displayed as a numeric value. In this manner, the need for the operator's operation can be obviated, thus improving the operability.

The icon displaying step of this embodiment may cancel numeric value display of the color difference value upon input of a cancel instruction to cancel the numeric value display after the color difference value represented by the patch icon selected in the selecting step is displayed as a numeric value. In this manner, since a plurality of color difference values can be displayed at the same time, the visibility of the display results can improve.

Furthermore, the patch icons of this embodiment may be color-coded in accordance with the magnitudes of the corresponding color difference values. Since the operator can discriminate the degrees of color difference values based on colors, the visibility can improve.

Other Embodiments

Various embodiments have been explained. However, the present invention can be applied to either a system constituted by a plurality of devices, or an apparatus consisting of a single device. For example, the present invention may be applied to a printer, facsimile, PC, a computer including a server and client, and the like.

The present invention can also be achieved by directly or remotely supplying a program of software that implements the functions of the above mentioned embodiments to a system or apparatus, and reading out and executing the supplied program code by a computer of that system or apparatus.

Therefore, the program code itself installed in a computer to implement the functions and processing of the present invention using the computer implements the present invention. That is, the present invention includes the computer program itself for implementing the functions and processing of the present invention.

In this case, the form of program is not particularly limited, and an object code, a program to be executed by an interpreter, script data to be supplied to an OS, and the like may be used as along as they have the program function.

As a recording medium for supplying the program, for example, a flexible disk, hard disk, optical disk, magneto-optical disk, MO, CD-ROM, CD-R, CD-RW, and the like may be used. Also, as the recording medium, a magnetic tape, nonvolatile memory card, ROM, DVD (DVD-ROM, DVD-R), and the like may be used.

The program may also be downloaded from a home page on the Internet using a browser running on a client computer. That is, the computer program itself of the present invention or a compressed file including an automatic installation function may be downloaded onto a recording medium such as a hard disk or the like. The program code which forms the program of the present invention may be segmented into a plurality of files, and the respective files may be downloaded from different home pages. That is, a WWW server which makes a plurality of users download the program file for implementing the functions and processing of the present invention using a computer may also become a building component of the present invention.

A storage medium such as a CD-ROM or the like, which stores the encrypted program of the present invention may be distributed to users. In this case, only a user who meets predetermined conditions is allowed to download key information used to decrypt the encrypted program from a home page via the Internet, to decrypt the encrypted program using that key information, and to install the program in the computer.

The functions of the above mentioned embodiments may be implemented by executing the readout program code by the computer. Note that an OS or the like running on the computer may execute some or all of actual processes on the basis of an instruction of that program. Of course, in such case as well, the functions of the above mentioned embodiments can be implemented.

Furthermore, the program read out from the recording medium may be written in a memory equipped in a function extension board or function extension unit, which is inserted in or connected to the computer. Based on an instruction of that program, a CPU or the like equipped in the function extension board or function extension unit may execute some or all of actual processes. In this way, the functions of the above mentioned embodiments may be implemented.

The present invention allows the operator to easily identify the correspondence between the patch icons and their color difference values by switching the display formats of the color difference values.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-023624, filed Jan. 31, 2006, which is hereby incorporated by reference herein in its entirety.

What is claimed is:

1. A control method of a color difference display control apparatus comprising:
  a step of inputting input data associated with spectral reflectances of respective patches on a first measurement chart and a second measurement chart which record a plurality of color patches;
  a step of computing color differences between the patches corresponding to identical positions on the first measurement chart and the second measurement chart based on the input data input in the inputting step;
  a icon displaying step of displaying the plurality of computed color differences as a plurality of patch icons on a display unit, wherein each patch icon is displayed in a display region corresponding to each position of the color patches on the first measurement chart and the second measurement chart;
  a step of comparing a width of the patch icons displayed on the display unit and a text size of character used to display numeric values representing the color differences on the display unit;
  a step of displaying the color differences represented by the patch icons in a first display format as numeric values within each of the display regions of the corresponding patch icons if the width of the patch icons is larger than the text size of character; and
  a step of displaying the color differences represented by the patch icons in a second display format on the display unit as numeric values within a popup window that is laid over the display regions of a plurality of patch icons if the width of the patch icons is equal to or smaller than the text size of character.

2. The control method of a color difference display control apparatus according to claim 1, further comprising a numeric value displaying step of selecting one of the first display format and the second display format, and displaying, as numeric values, the color differences within the display regions of the respective patch icons.

3. The control method of a color difference display control apparatus according to claim 2, wherein in the numeric value displaying step, the color difference represented by each patch icon is displayed as a numeric value using a popup window.

4. The control method of a color difference display control apparatus according to claim 1, further comprising a selecting step of selecting a patch icon, the color difference of which is to be displayed in the second display format, of the plurality of patch icons, and
  wherein in the icon displaying step, the color difference represented by the patch icon selected in the selecting step is displayed as a numeric value in the second display format.

5. The control method of a color difference display control apparatus according to claim 4, wherein in the selecting step, not less than two neighboring patch icons of the plurality of patch icons are selected.

6. The control method of a color difference display control apparatus according to claim 4, wherein in the selecting step, not less than two non-neighboring patch icons of the plurality of patch icons are selected.

7. The control method of a color difference display control apparatus according to claim 4, wherein in the icon displaying step, a numeric value display of the color difference is canceled after an elapse of a predetermined period of time since the color difference represented by the patch icon selected in the selecting step is displayed as a numeric value.

8. The control method of a color difference display control apparatus according to claim 4, wherein in the icon displaying step, a numeric value display of the color difference is canceled when a cancel instruction to cancel the numeric value display is input after the color difference represented by the patch icon selected in the selecting step is displayed as a numeric value.

9. The control method of a color difference display control apparatus according to claim 1, wherein the patch icons are color-coded according to magnitudes of the color differences.

10. A color difference display control apparatus comprising:
   an input unit adapted to input data associated with spectral reflectances of respective patches on a first measurement chart and a second measurement chart which record a plurality of color patches;
   a computing unit adapted to compute color differences between the patches corresponding to identical positions on the first measurement chart and the second measurement chart based on the data input by the input unit;
   an icon display unit adapted to display the plurality of computed color differences as a plurality of patch icons, wherein each patch icon is displayed in a display region corresponding to each position of the color patches on the first measurement chart and the second measurement chart;
   a comparing unit that compares a width of the patch icons displayed on the display unit and a text size of character used to display numeric values representing the color differences on the display unit;
   a first display unit adapted to display the color differences represented by the patch icons in a first display format as numeric values within each of the display regions of the corresponding patch icons if the width of the patch icons is larger than the text size of character; and
   a second display unit adapted to display the color differences represented by the patch icons in a second display format as numeric values within a popup window that is laid over the display regions of a plurality of patch icons if the width of the patch icons is equal to or smaller than the text size of character.

11. The color difference display control apparatus according to claim 10, further comprising a numeric value display unit that selects one of the first display format and the second display format, and displays, as numeric values, the color differences within the display regions of the respective patch icons.

12. The color difference display control apparatus according to claim 11, wherein the color difference represented by each patch icon is displayed as a numeric value using a popup window by the numeric value display unit.

13. The color difference display control apparatus according to claim 10, further comprising a selecting unit that selects a patch icon, the color difference of which is to be displayed in the second display format, of the plurality of patch icons, and wherein the color difference represented by the patch icon selected by the selecting unit is displayed as a numeric value in the second display format by the icon display unit.

14. The color difference display control apparatus according to claim 13, wherein not less than two neighboring patch icons of the plurality of patch icons are selected by the selecting unit.

15. The color difference display control apparatus according to claim 13, wherein not less than two non-neighboring patch icons of the plurality of patch icons are selected by the selecting unit.

16. The color difference display control apparatus according to claim 13, wherein a numeric value display of the color difference is canceled by the icon display unit after an elapse of a predetermined period of time since the color difference represented by the patch icon selected by the selecting unit is displayed as a numeric value.

17. The color difference display control apparatus according to claim 13, wherein a numeric value display of the color difference is canceled by the icon display unit when a cancel instruction to cancel the numeric value display is input after the color difference represented by the patch icon selected by the selecting unit is displayed as a numeric value.

18. The color difference display control apparatus according to claim 10, wherein the patch icons are color-coded according to magnitudes of the color differences.

19. A non-transitory computer-readable storage medium storing a computer program for making a computer execute a color control method of a color difference display control apparatus, said method comprising:
   a step of inputting input data associated with spectral reflectances of respective patches on a first measurement chart and a second measurement chart which record a plurality of color patches;
   a step of computing color differences between the patches corresponding to identical positions on the first measurement chart and the second measurement chart based on the input data;
   a icon displaying step of displaying the plurality of computed color differences as a plurality of patch icons on a display unit, wherein each patch icon is displayed in a display region corresponding to each position of the color patches on the first measurement chart and the second measurement chart;
   a step of comparing a width of the patch icons displayed on the display unit and a text size of character used to display numeric values representing the color differences on the display unit;
   a step of displaying the color differences represented by the patch icons in a first display format as numeric values within each of the display regions of the corresponding patch icons if the width of the patch icons is larger than the text size of character; and
   a step of displaying the color differences represented by the patch icons in a second display format on the display unit as numeric values within a popup window that is laid over the display regions of a plurality of patch icons if the width of the patch icons is equal to or smaller than the text size of character.

* * * * *